United States Patent Office 3,019,105
Patented Jan. 30, 1962

3,019,105
TREATMENT OF DIAZO-SENSITIZED LITHOGRAPHIC PLATES
Dolor N. Adams, Cleveland Heights, Ohio, assignor to Harris-Intertype Corporation, a corporation of Delaware
No Drawing. Filed Feb. 28, 1957, Ser. No. 642,963
10 Claims. (Cl. 96—33)

The present improvements, relating as indicated to treatment of diazo-sensitized lithographic plates, have more particular regard to the treatment thereof following exposure in order to prepare such plate for printing use. Such improvements further comprehend a composition for use in such preparatory treatment whereby there may be removed from such an exposed, diazo-sensitized plate, the unexposed diazo compound, the area from which such unexposed compound is removed be desensitized, and a visible, ink-attractive layer be formed on the exposed diazo compound to constitute the printing area.

To effectuate the foregoing treatment, the composition employed will desirably, if not necessarily, be in liquid form in order that the application thereof to the plate may be facilitated and such liquid will preferably be an oil-in-water type of emulsion. This must be to insure that the plate surface is contacted first by the water phase which removes the unexposed diazo and desensitizes the non-printing area by depositing a hydrophilic gum layer. A necessary property of the water phase is that it is not capable of forming on the printing area (exposed diazo) a hydrophilic layer so tenaciously bound that the diazo image is rendered water attractive.

The emulsion must be sufficiently unstable so that during the rubbing of the plate surface with the liquid, the oil phase separates from the water phase so that the oil phase can form a layer onto the light hardened diazo. It is also necessary that the emulsion be sufficiently stable to permit normal shipping and handling, and further that the oil phase can be redispersed into the water phase with simple shaking.

Other objects and advantages will become apparent as the following description proceeds.

To the accomplishment of the foregoing and related ends, the invention, then, comprises the features hereinafter fully described and particularly pointed out in the claims, the following description setting forth in detail certain illustrative embodiments of the invention, these being indicative, however, of but a few of the various ways in which the principle of the invention may be employed.

To make a workable liquid that permits rubbing for a long time and without the development of a sticking, tacky condition, there is used a water soluble polyhydric alcohol, of low vapor pressure, relatively insoluble and immiscible in the oil phase; this alcohol provides lubricity and brings about a gradual separation from solution in the presence of considerable water (about 20%) of the hydrophilic colloid which acts as the des sitizer; this is a change which takes place as the water content is reduced which is at a time after the unhardened diazo has been dissolved. The dissolving of the diazo is facilitated by adjusting the pH of the liquid to a condition where the solubility of the diazo is favored; to process plates when the diazo is more soluble in an acid medium the liquid is made acid up to a pH of about 2.3 maximum. The preferred range is between a pH of 3.5 and 5.5 where the liquid is to be used for treating diazo-sensitized plates that call for an acid medium. For the purpose of adjusting the pH on the acid side, phosphoric acid and phosphates of an acid type, such as mono-ammonium dihydrogen phosphate may be used. On the basic side, ammonium phosphate or tri-sodium phosphate may be used to extend the pH, for example, to about 9 or 10 if required by the diazo material involved.

The component that forms the oil phase of the foregoing emulsion will contain essentially an oil such as bodied linseed oil, coloring matter such as a dye and/or carbon black, and a solid film forming material such as aluminum stearate; plus a solvent like a terpene; advantageously it may contain additional materials such as asphaltum, and a resinous material insoluble in the oil but soluble in an added solvent; for example a vinyl resin dissolved in cyclohexanone.

Similarly the component which forms the water phase of such emulsion will contain essentially water, a hydrophilic colloid, and a polyhydric, water miscible alcohol relatively insoluble in the oil phase; advantageously it may use two hydrophilic colloids and a dispersant which facilitates forming an oil-in-water dispersion.

The following table sets forth in more detail the ingredients and quantities thereof which have been found satisfactory in formulating such oil phase and water phase, respectively, it being noted that for a simple formula certain of the ingredients indicated for a preferred formula may be omitted, as indicated:

| Ingredients | Quantities | |
|---|---|---|
| | For a Simple Formula | For a Preferred Formula |
| Oil Phase: | | |
| Lard Oil | None | 394 grams. |
| Powdered Asphalt | None | 80 grams. |
| #1 Litho Varnish | 92 grams | 92 grams. |
| VYHH Vinylite Resin | None | 77 grams. |
| Hastings Violet Dye | 92½ grams | 9¾ grams. |
| Aluminum Stearate | 77 grams | 77 grams. |
| Cyclohexanone | None | 282 mls. |
| Nelio Dipentene | 300 mls | 1,000 mls. |
| Carbon Black | None | 190 grams. |
| Water Phase: | | |
| Isopropanol | None | 584 mls. |
| Sodium Carboxymethyl Cellulose | 130 grams | 130 grams. |
| Water | 8,743 mls | 5,254 mls. |
| Carbowax 400, Polyethylene Glycol | 4,347 mls | 4,347 mls. |
| Alkyl Phenyl Ether of Polyethylene Glycol | 324 mls. of a 10% v./v. Solution in Water. | 324 mls. of a 10% v./v. Solution in Water. |
| Gum Arabic Solution, 14° Bé. in Water. | None | 2,905 mls. |

"Vinylite" is a proprietary trade name for polyvinyl acetate, polyvinyl chloride-polyvinyl acetate, and polyvinyl chloride synthetic resins. Nelio dipentene is a mixture of terpene hydrocarbons.

In combining the oil phase and water phase, the ratio may vary somewhat depending on conditions; in the preferred formula the oil phase should be about one-twelfth by volume of the water phase. The procedure followed in preparing the emulsion, equally with the selection of the components, will affect the type and stability of the resulting product. The following are the steps recommended for such preparation, viz.:

Slurry the Na CMC in isopropyl alcohol.
Add water quickly with rapid stirring to dissolve the Na CMC.
Add the Carbowax "400." Stir.
Add the 10% v./v. dispersant solution in water. Stir.
Add the oil phase. Stir.
At this stage, run mix through a colloid mill.
Add the gum arabic solution. Stir and bottle.

In the foregoing it will of course be understood that the symbol CMC stands for carboxymethyl cellulose. A suitable mill will be an Eppenbach QV-7 colloid mill. Such mill will initially be set loose and then tightened by changing rotor-stator clearance.

In using the emulsion thus prepared, a sufficient quantity is poured over the exposed plate surface, so that when rubbed, as with absorbent cotton or a cellulose sponge, the liquid may be spread entirely over such surface. As a result, the printing portions will accept some of the oil phase and become visible. When the liquid has been rubbed for some time, it will start to dry down and at this point it should be rubbed out to an even film. This operation in turn does the following to the plate: (a) It develops and desensitizes the non-printing portions; (b) it coats and colors the printing surfaces; and (c) it gums the plate.

By use of the above-described improved composition in the manner thus set forth, the entire procedure required to prepare for printing use a so-called "pre-sensitized" plate (the name by which plates coated with a light-sensitive diazo compound, instead of the conventional compound in which sodium bichromate is the light-sensitive ingredient have become known) is greatly simplified and facilitated. In other words, to employ such plate it is only necessary (a) to expose the plate through a negative; (b) apply my improved liquid composition or emulsion to the surface thereof which carries the light-sensitive coating; and (c) wipe off excess treating liquid and dry. The plate is then ready for the press.

Other modes of applying the principle of the invention may be employed, change being made as regards the details described, provided the features stated in any of the following claims, or the equivalent of such, be employed.

I, therefore, particularly point out and distinctly claim as my invention:

1. In a method of preparing for printing an exposed lithographic plate having printing areas coated with water-insoluble oleophilic light-decomposition products of a diazo compound and non-printing areas coated with a water-soluble diazo compound; the steps of pouring on the plate an oil-in-water emulsion having an oil phase comprising an emulsifying oil, a dye, aluminum stearate, and an organic solvent for such oil, dye, and stearate, and a water phase comprising water, sodium carboxymethyl cellulose, a liquid water-miscible polyethylene glycol relatively insoluble in the oil phase, and the liquid alkyl phenyl ether of such liquid polyethylene glycol has a dispersant; rubbing such emulsion against the plate to remove the water soluble diazo compound from the non-printing areas by the water phase while depositing at least some of such sodium carboxymethyl cellulose on such non-printing areas to increase the water-attractiveness thereof, such glycol providing lubricity for such rubbing step; and separating the oil phase from the emulsion by such rubbing to deposit the aluminum stearate as a film over such printing areas to increase the ink-attractiveness thereof.

2. In a method of preparing for printing an exposed lithographic plate having printing areas coated with water-insoluble oleophilic light-decomposition products of a diazo compound and non-printing areas coated with a water-soluble diazo compound; the steps of pouring on the plate a single oil-in-water emulsion relatively unstable under a rubbing action; such emulsion having an oil phase comprising bodied linseed oil, aluminum stearate, and a terpene solvent for such oil and stearate, and a water phase comprising water, sodium carboxymethyl cellulose, and liquid polyethylene glycol; rubbing such emulsion against the plate to remove the water-soluble diazo compound from the non-printing areas by the water phase while depositing at least some of the sodium carboxymethyl cellulose on such non-printing areas to increase the water-attractiveness thereof, such glycol providing lubricity for such rubbing step; and separating the oil phase from the emulsion by such rubbing to deposit the aluminum stearate from the oil phase as a film over such printing areas to increase the ink-attractiveness thereof.

3. The method of claim 2 wherein sufficient aluminum stearate is present to cover such printing areas, sufficient linseed oil and terpene are present to effect such emulsifying and solvent actions, respectively, and wherein sufficient sodium carboxymethyl cellulose and polyethylene glycol are present to effect such hydrophilic-enhancing and lubricating functions.

4. The method of claim 2 wherein such water phase further includes sufficient gum arabic to gum the plate.

5. A composition for preparing for printing an exposed lithographic plate having printing areas coated with water-insoluble oleophilic light-decomposition products of a diazo compound and non-printing areas coated with a water-soluble diazo compound; said composition comprising an oil-in-water emulsion having an oil phase comprising bodied linseed oil, aluminum stearate, and a terpene solvent for such oil and stearate, and a water phase comprising water, sodium carboxymethyl cellulose, and liquid polyethylene glycol, said oil phase being adapted to deposit the aluminum stearate over said printing areas to increase the ink-attractiveness thereof; and said water phase being adapted to remove the water-soluble diazo compound from the non-printing areas and deposit at least some of the sodium carboxy-methyl cellulose thereon to improve the water-attractiveness of such areas, said polyethylene glycol serving to provide lubricity.

6. The composition of claim 5 wherein sufficient aluminum stearate is present to cover such printing areas, sufficient linseed oil and terpene solvent are present to effect such emulsifying and solvent actions, respectively, and wherein sufficient sodium carboxymethyl cellulose and polyethylene glycol are present to effect such hydrophilic-imparting and lubricating functions.

7. The composition of claim 5 wherein such water phase further includes sufficient gum arabic to gum the plate.

8. A method of preparing for printing by treatment with a single liquid composition an exposed lithographic plate having printing areas coated with water-insoluble oleophilic light-decomposition products of a diazo compound and non-printing areas coated with a water-soluble diazo compound: comprising the steps of pouring on the plate an oil-in-water emulsion defining such single liquid composition having an oil phase comprising a film-former selected from the group consisting of aluminum stearate and asphalt, and an organic solvent for such film-former, and a water phase comprising water, a desensitizer selected from the group consisting of sodium carboxymethyl cellulose and gum arabic, and a liquid water-miscible glycol consisting essentially of liquid polyethylene glycol, rubbing such emulsion against the plate to remove the water-soluble diazo compound from the non-printing areas by the water phase while depositing at least some of such desensitizer on such non-printing areas to increase the water-attractiveness thereof, and separating the oil phase from the emulsion by such rubbing to deposit the film-former as a film over such printing areas to increase the ink-attractiveness thereof.

9. A composition for preparing for printing by a single treatment therewith an exposed lithographic plate having printing areas coated with water-insoluble oleophilic light-decomposition products of a diazo compound and non-printing areas coated with a water-soluble diazo compound; said composition comprising an oil-in-water emulsion having an oil phase comprising a film-former selected from the group consisting of aluminum stearate and asphalt, and an organic solvent for such film-former; and a water phase comprising water, a desensitizer selected from the group consisting of sodium carboxymethyl cellulose and gum arabic, and a liquid glycol consisting essentially of liquid polyethylene glycol; said water phase being adapted initially to remove the water-soluble diazo compound from the non-printing areas and deposit at least some of such desensitizer thereon to improve the water-attractiveness of such areas, and said oil phase being subsequently adapted upon separation of the emulsion to deposit the film-former over the printing areas to increase the ink-attractiveness thereof.

10. The composition of claim 9 further including as a dispersant the liquid alkyl phenyl ether of said liquid polyethylene glycol.

References Cited in the file of this patent

UNITED STATES PATENTS

| | | |
|---|---|---|
| 2,308,763 | Little | Jan. 19, 1943 |
| 2,413,320 | Griffin et al. | Dec. 31, 1946 |
| 2,587,657 | Schulte et al. | Mar. 4, 1952 |
| 2,666,038 | Eisen | Jan. 12, 1954 |
| 2,692,827 | Brinnick | Oct. 26, 1954 |
| 2,754,279 | Hall | July 10, 1956 |
| 2,759,817 | Schmidt et al. | Aug. 21, 1956 |
| 2,865,873 | Hodgins et al. | Dec. 23, 1958 |

FOREIGN PATENTS

| | | |
|---|---|---|
| 414,801 | Great Britain | Aug. 16, 1934 |
| 732,544 | Great Britain | June 29, 1955 |